UNITED STATES PATENT OFFICE.

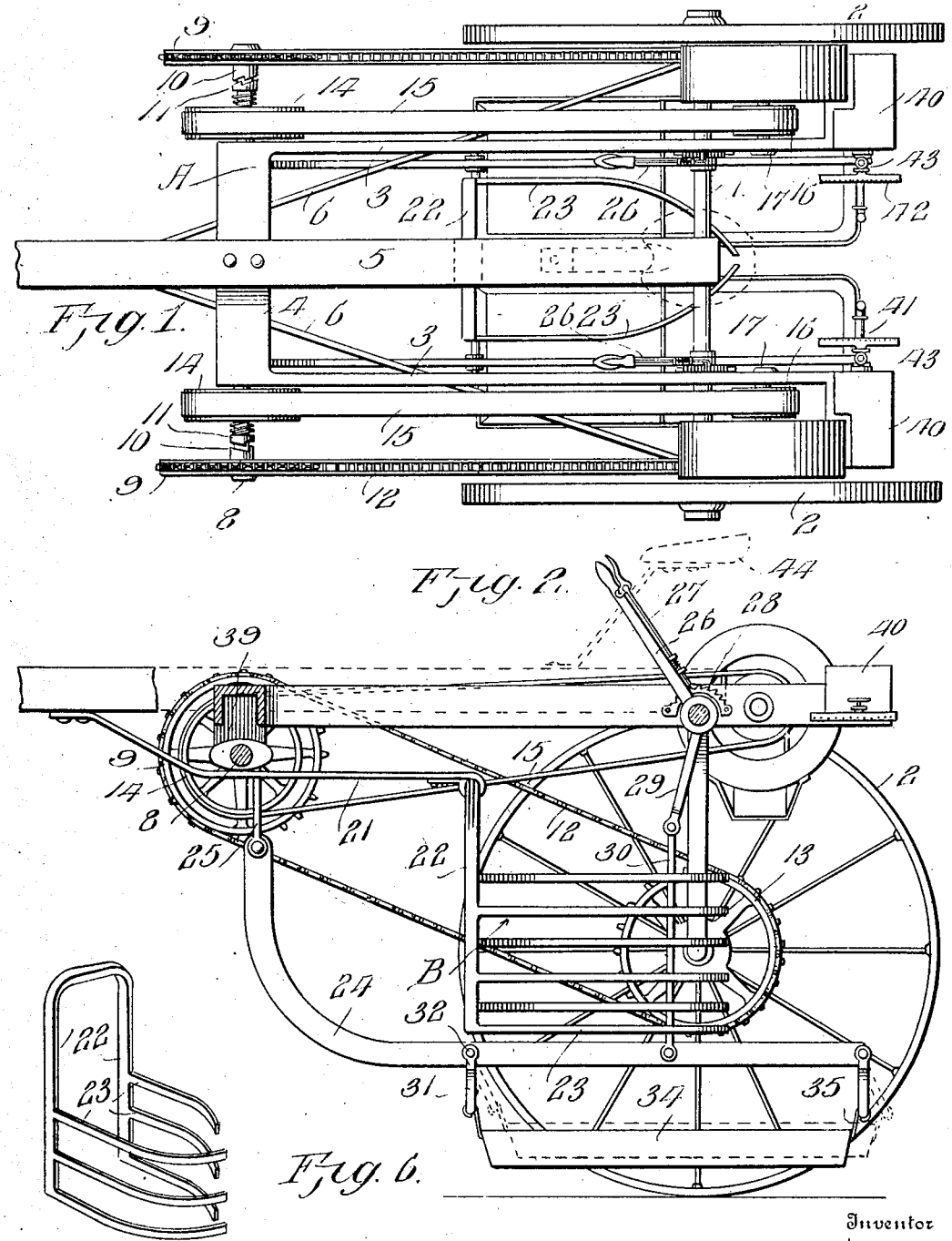

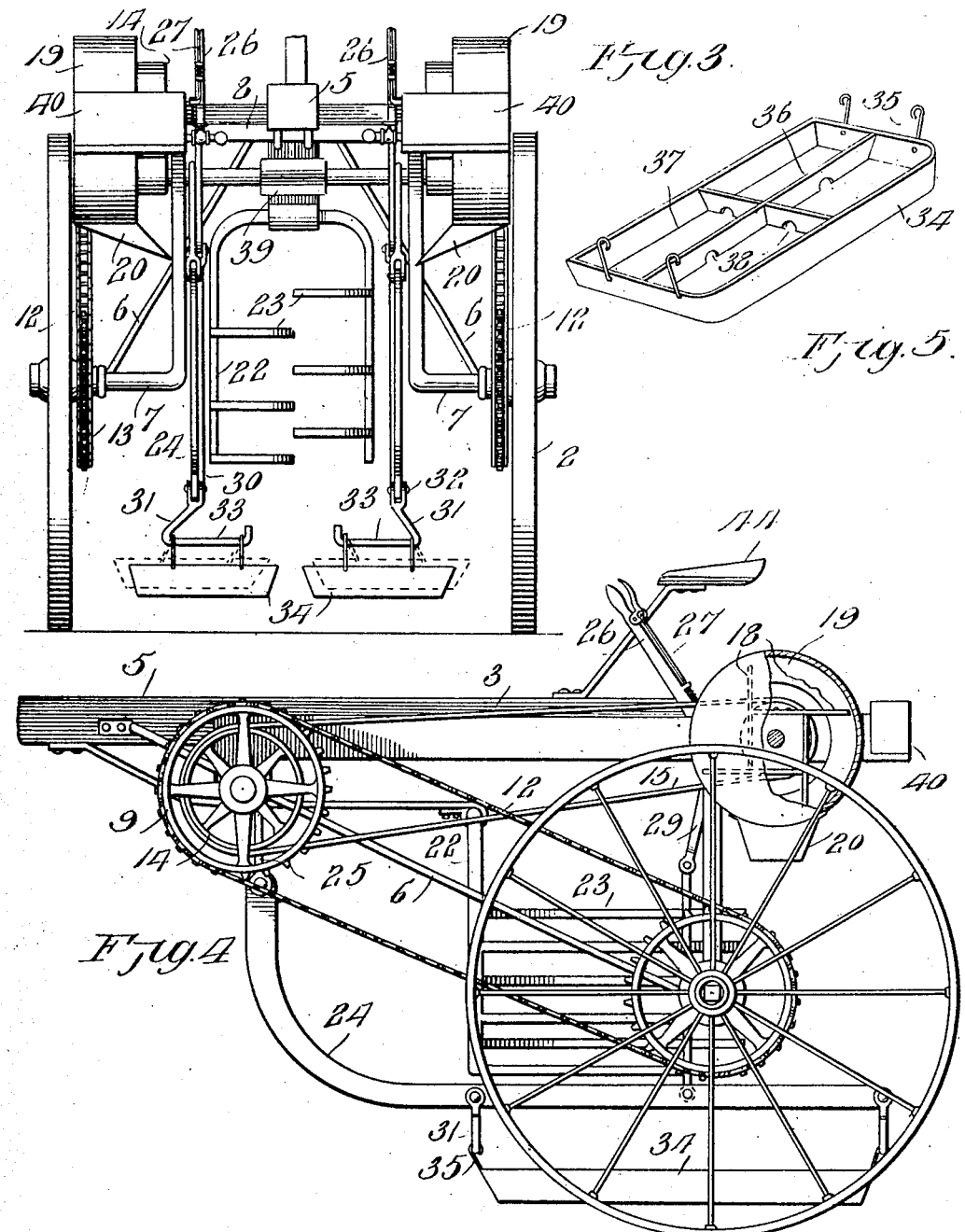

JOHN J. VICKERS, OF LEESBURG, TEXAS.

INSECT-DESTROYER.

No. 892,781.　　　Specification of Letters Patent.　　Patented July 7, 1908.

Application filed October 25, 1907. Serial No. 399,214.

*To all whom it may concern:*

Be it known that I, JOHN J. VICKERS, a citizen of the United States of America, residing at Leesburg, in the county of Camp and State of Texas, have invented new and useful Improvements in Insect-Destroyers, of which the following is a specification.

This invention relates to machines or devices for destroying insects infesting growing plants, such as boll weevils, and it has particular reference to that class of machines which are provided with beaters for agitating the plants, with blowers for detaching the dead leaves, the infested bolls and the insects and with receptacles into which the infested bolls and insects are dropped, said receptacles being preferably partly filled with liquid, such as crude oil, whereby the insects may be effectively destroyed.

The present invention has for its object to simplify and improve the construction and operation of this class of devices, and with these and other ends in view which will readily appear as the nature of the invention is better understood, the same consists in the improved construction, novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawings,—Figure 1 is a top plan view of a machine constructed in accordance with the invention. Fig. 2 is a longitudinal vertical sectional view of the same. Fig. 3 is a rear elevation. Fig. 4 is a side elevation. Fig. 5 is a perspective detail view of one of the pans or receptacles. Fig. 6 is a perspective detail view of the agitator or beater used in connection with the invention.

Corresponding parts in the several figures are denoted by like characters of reference.

The horizontal main frame A of the improved machine is supported upon an arched axle 1, upon which the transporting wheels 2, 2 are mounted for rotation; the side members 3, 3 of the frame being connected at their front ends by a cross bar 4, which latter, together with the axle, supports a pole or tongue 5 to which the draft may be attached in the usual manner, as by means of a doubletree, not shown. Braces 6 connect the tongue with the spindles 7 upon which the transporting wheels are mounted.

The main frame is provided near its front end with bearings for a transverse shaft 8 having sprocket wheels 9, the hubs of which are formed with clutch members 10 adapted for engagement with spring actuated clutch members 11 upon the said shaft 8. The sprocket wheels 9 are connected by link belts 12 with sprocket wheels 13 secured upon or connected with the transporting wheels 2, from which motion may thus be transmitted to the shaft 8 when the machine is traveling in a forward direction. The shaft 8 is provided with band wheels 14 connected by belts or bands 15 with pulleys 16 upon shafts 17 carrying suitable fans 18, shown in Fig. 4 of the drawings, said fans being surrounded by casings 19 which are suitably supported upon the frame of the machine; said fan casings being provided with discharge spouts 20 which are preferably arranged to discharge air blast in an inward direction, towards the longitudinal center of the frame of the machine.

Suitably secured upon the underside of the tongue, in advance of the transverse shaft 8, and extending rearwardly beneath the tongue and below said shaft 8 is a flat spring 21 carrying at its free rear end a beater or agitator B which may be described as consisting of an inverted U-shaped frame or yoke 22, the limbs or side members of which are provided with rearwardly extending curved, convergent fingers 23, the free rear extremities of which are slightly spaced apart, as will be clearly seen in Fig. 1 of the drawings. The fingers 23 may be disposed intercurrently upon the limbs 22, so as to break joints with each other, as will be very clearly seen in Fig. 3 of the drawings; but the exact arrangement of said fingers may be left to the discretion of the builder of the machine. The yoke 22, as well as the fingers 23, is preferably to be constructed of resilient material, which, while effectively engaging the plants to beat and agitate the latter, will yield to the pressure of the stalks and branches so that the progress of the machine will not be hindered, and the plants will be in no wise injured by the action of the beater. The latter, it will be observed, is supported centrally of the machine, beneath the tongue, and the blast from the two fans or blowers will be directed towards the rear extremity of the beater. The forward portion of the frame A supports the front ends of a pair of beams 24, the front ends of which are curved or extended upwardly, as shown, and provided with supporting members, such as links 25. The frame is equipped with adjusting levers 26 having stop members 27 engaging ratchet segments 28, whereby said levers and the parts controlled thereby may be secured at various adjustments. The adjusting levers are provided with downwardly extending arms 29 connected by links 30 with the beams 24, which latter may thus be raised or lowered and supported in various positions. Each of the beams 24 is provided with supporting members consisting of brackets 31 which are pivoted upon the beams by means of transverse pins 32, so that said brackets are capable of swinging longitudinally of the beams; the brackets 31 are provided with laterally extending arms 33, upon which the pans or receptacles 34 are supported by means of hooks 35 which latter are pivotally connected with the pans in such a manner that the latter will be free to swing laterally, as indicated in dotted lines in Fig. 3 of the drawings. The supporting brackets 31, being free to swing longitudinally, as indicated in dotted lines in Fig. 2 of the drawings, it follows that the pans 34 are suspended for free or universal movement, and that said pans will be free to clear all obstructions, and to swing clear of the stalks or plants when the latter are out of regular alinement, as is frequently the case. When thus swinging, the pans will remain supported in approximately horizontal position, so that there will be little danger of spilling the contents. The pans 34, as will be seen in Fig. 5 of the drawings, are provided with partitions 36, whereby they are subdivided into compartments 37, and said partitions may be provided with apertures 38 establishing communication between the several compartments so that liquid placed in said pans will stand at the same level in all of the compartments. By this construction the danger of spilling the contents of the pans when the machine is moved about is greatly reduced. In practice, it is intended to place an insect destroying liquid, such as crude oil, in the pans, so that insects dropping therein will be surely and quickly destroyed.

The shaft 8 which, when the machine is in operation, receives motion from the transporting wheels in the manner hereinbefore described, is provided with a cam or eccentric 39 engaging the beater supporting spring 21, so that, as the machine progresses, the beater will be positively shaken or agitated and caused to operate effectively upon the plants.

Suitably supported upon the frame of the machine, near the rear ends of the side members of said frame, are tanks or vessels 40 having discharge pipes or spouts 41 equipped with sprinklers 42 and controlling valves 43; and these may be utilized for sprinkling or spraying the plants with some suitable liquid for the purpose of assisting in destroying the insects, for protecting the plants against the attacks of insects or other pests, for fertilizing and promoting the growth of plants or for any other purpose that may be desired.

A seat 44 for the driver or operator is suitably supported upon the tongue or upon any desired portion of the frame of the machine.

From the foregoing description, taken in connection with the drawings hereto annexed, the operation and advantages of this invention will be readily understood by those skilled in the art to which it appertains. The construction of the improved machine is simple and inexpensive. In operation, it is intended to straddle the row of growing plants which is engaged upon both sides by the rearwardly extend ng curved resilient fingers of the beater or agitator; the latter will operate to loosen the dead leaves and bolls and to dislodge the insects adhering to the plants; the trash and insects being immediately subjected to the blast from the blowers and discharged into the pans 34 which are supported closely adjacent to the stalks of the plants a short distance above the ground, but which, as hereinbefore stated, will yield to any obstructions and readily swing aside to clear such obstructions, as well as the stalks of such plants as may be out of proper alinement. It will also be observed that by manipulating the adjusting levers 26 the pans may be supported at various distances above the ground, as may be required by varying circumstances and varying conditions of the soil. The sprinkling devices may be utilized at will and may be dispensed with if desired. At intervals the pans may be emptied of their contents, which may be cremated or otherwise effectively disposed of.

The operation of the improved device is simple, rapid and thoroughly efficient for the purposes for which it is intended.

Having thus described the invention, what is claimed as new, is:—

1. In a machine of the class described, a wheeled supporting frame having a transverse shaft, means for transmitting motion to said shaft from the transporting wheels, rotary blowers supported upon the sides of the frame and having discharge spouts directed towards the longitudinal center of the frame, a plant-engaging beater supported resiliently between the blowers, vertically adjustable beams supported by the frame, and receptacles supported by said beams, for lateral and longitudinal movement, below the beater.

2. In a machine of the class described, an arched axle having transporting wheels, a frame supported upon the axle, a tongue supported upon the axle and frame centrally of the latter, a shaft supported for rotation upon the forward portion of the frame, means for transmitting motion to said shaft from the transporting wheels, a rearward extending spring supported upon the underside of the tongue in advance of the transverse shaft, a spring-engaging cam upon the shaft, a plant-engaging beater carried by the spring and including a yoke having rearward extending spaced resilient fingers, receptacles supported adjustably beneath the beater, and blowers operatively connected with the transverse shaft and having discharge spouts directed towards the rear end of the beater.

3. In a machine of the class described, a resiliently supported beater comprising a yoke having rearwardly convergent spaced resilient fingers.

4. In a machine of the class described, a resiliently supported beater including a yoke, the limbs of which are provided with intercurrently disposed rearwardly convergent fingers.

5. In a machine of the class described, a frame, a cam actuated spring connected therewith, a yoke supported by said spring, and spaced resilient fingers extending rearwardly from the limbs of said yoke.

6. In a machine of the class described, a frame, a resiliently supported cam-actuated beater including a yoke having rearwardly convergent spaced resilient fingers, pivotally mounted beams connected with the frame, adjusting levers, links connecting said levers with the beams, longitudinally movable brackets connected pivotally with the beams, and laterally movable receptacles pivotally supported and connected with said brackets.

7. In a machine of the class described, a frame, pivotally supported beams, means for effecting vertical adjustment of said beams, receptacles connected with said beams for longitudinal and lateral swinging movement, a plant-engaging beater supported resiliently above the receptacles, and means for discharging currents of air from opposite sides in the direction of the rear end of the beater.

8. In a machine of the class described, a frame, means supported by said frame for engaging a row of plants to loosen dead and insect-infested leaves and the like, receptacles, means for discharging currents of air in the direction of the plants above the receptacles, liquid containing tanks, and means for spraying the contents of said tanks upon the plants.

In testimony whereof I affix my signature in presence of two witnesses.

JOHN J. VICKERS.

Witnesses:
J. N. PITTS,
J. H. HAWKINS.